May 13, 1930.  J. W. HAZEN  1,758,254
PIANO KEYBOARD INSTRUCTION CHART
Filed July 25, 1927
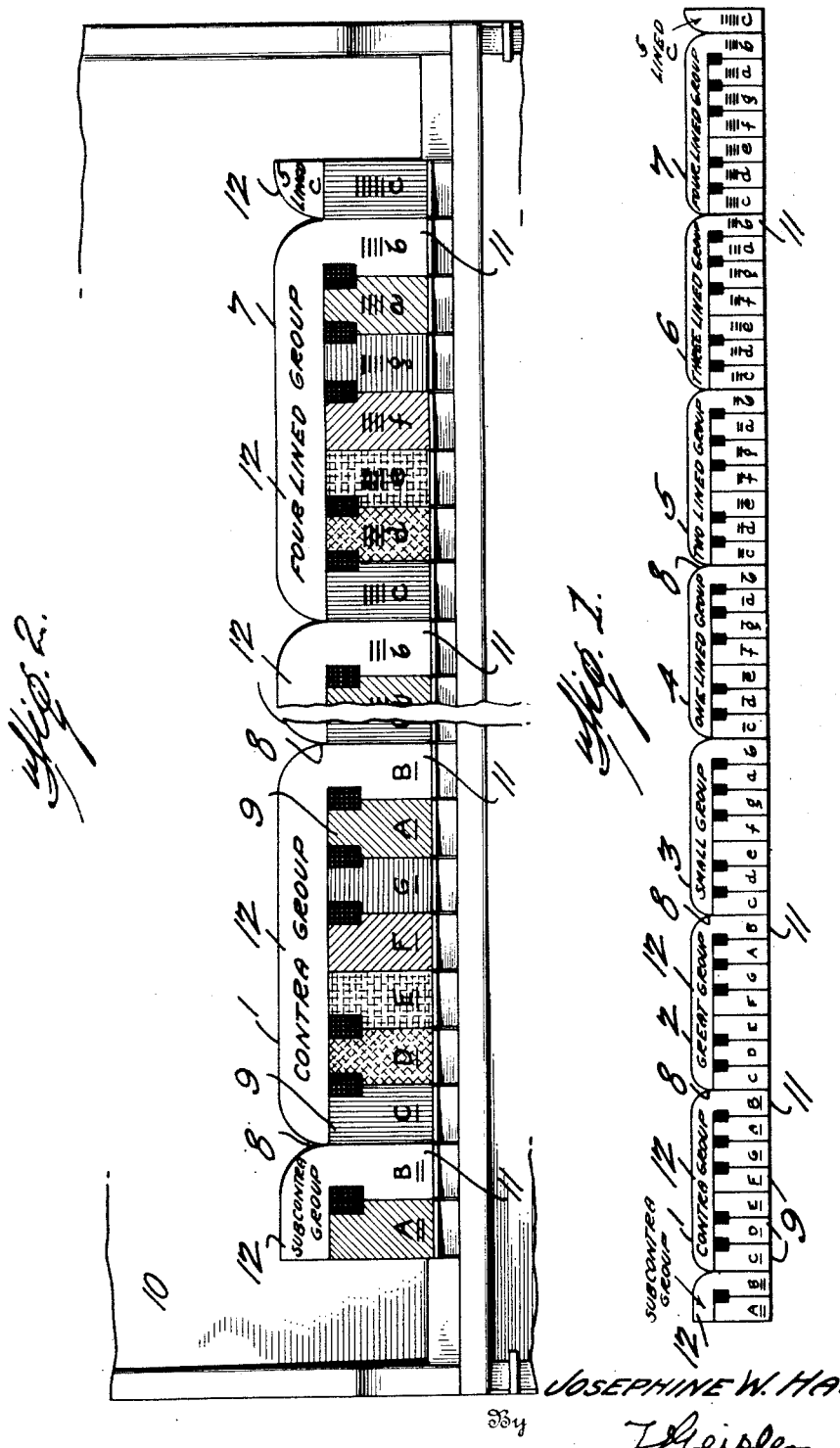
Inventor
JOSEPHINE W. HAZEN
By
J. Geisler
Attorney Patented May 13, 1930

1,758,254

UNITED STATES PATENT OFFICE

JOSEPHINE WATROUS HAZEN, OF PORTLAND, OREGON

PIANO-KEYBOARD-INSTRUCTION CHART

Application filed July 25, 1927. Serial No. 208,296.

The teaching of music to very young children has become such a general practice that I have found the need for a chart attracting the attention of the child, thereby to aid in the instruction of the fundamental principles of musical harmony and to familiarize the child with the piano keyboard arrangement.

The above mentioned features constitute the objects of my invention. I attain these objects in a chart which consists of an elongate strip of material adapted to be stood on the keys, against the name-board of the instrument, thus not interfering in any way with the use of the keys. The surface of said strip is divided into consecutive sections, preferably foldable one upon the other, such sections spanning the group of keys constituting an octave. The sections are lineally divided into smaller sections corresponding with the consecutive keys of the octave, the white keys sections of which are distinguished from each other by differentiating surfacing, preferably by the use of the prismatic colors, and a uniform distinguishable hand-like strip extends across the top of the surface of the entire octave section, whereby visually to tie the key-sections of the respective octave-sections together. Other features of my invention and the details thereof will now be described with reference to the accompanying drawing, in which therefore the youngest student is not confused by a medley of unfamiliar signs, and all beginners in the study of the keyboard are pleasantly inspired by the gay array of colors which relieve its usual monotonous look.

The invention is illustrated in the accompanying drawings, in which:

Figure 1 shows a diagrammatic outline of my chart extended, and

Figure 2 shows a fragmentary view of the name-board and the keyboard of a piano with my chart stood on the keys against the name-board, and this view illustrates how the keys designating the sectional surfaces of my chart are differentiated and tied together in accordance with my invention.

My chart comprises a foldable strip of material divided into a series of sections as 1, 2, 3, etc. foldable upon each other. The folding lines 8 divide the octave sections from each other, giving the student the impression of the seven complete octave groups and portions of groups at the ends as commonly found in a piano keyboard. The generally accepted octave group names of subcontra, contra, great, small, one-lined, two-lined, three-lined, four-lined and five-lined, are printed in the respective sections. Fig. 1 of the accompanying drawing illustrates the appearance of my chart against the board 10 at the back of the keys.

The lower portions of my chart are divided into consecutive sections spanning the piano keys constituting an octave and are colored preferably to represent the prismatic colors and white, namely, red, orange, yellow, green, blue, violet, white, to represent the seven keys 1 to 7 of each octave group, Figs. 2 and 3, with the tablature letter-name of each piano key printed in black on its color representation. The individual white key sections are lineally divided from each other, and the black keys are indicated by black squares 11 to correspond with the relative position of the black to the white keys on the piano keyboard.

Six of the key-sections 9, are marked, or colored as mentioned, and the remaining or end key 11 is left blank to connect and blend with the blank, or band-like strip 12, extending across the entire group of the key-sections constituting the octave, thereby to tie such group of keys together.

The particular advantage of my chart is its use in musical kindergartens where systems now in use designate staff notation by color; in public schools or large classes where each student can possess one of my charts for his individual use while instruction is being conducted and it is impossible for him to come in contact with a piano keyboard and difficult to follow illustrations pointed out on a large chart by the instructor of harmony, scale building, or musical theory. The color harmony on the marker is a source of inspiration to the student and correlates nicely as taught in most schools with the harmony of music.

I preferably constructed my chart so as to be foldable along the dividing line 12 of each of the sections 9 so that when not in use the chart may be folded up and put away by the student and occupy but very little space in his desk. Incidentally the fold-lines between the octave sections serve to separate the latter from each other, and to tie the key sections of the respective octave sections together.

I am aware that there have been devices for indication of the letters on the piano keyboard made prior to mine so I do not claim that invention but limit my claims to—

1. A chart for designating the keys of a piano and like instrument comprising an elongate strip of material adapted to be stood on the keys against the name-board of the instrument, the surface of the strip being divided into consecutive sections, each spanning the keys constituting an octave, such sections being lineally subdivided into smaller sections corresponding with the consecutive keys of an octave, the white key-sections of the octave being distinguished from each other by differentiating surfacing joined to a uniform distinguishable band-like strip extending across the top surface of the entire octave section, and the surface of one end-key section of each octave section blending with said band-like strip, whereby visually to tie the key-sections of the respective octave-sections together.

2. A chart for designating the keys of a piano and like instrument comprising an elongate strip of material adapted to be stood on the keys against the name-board of the instrument, the surface of the strip being divided into consecutive sections, each spanning the keys constituting an octave, such sections being lineally subdivided into smaller sections corresponding with the consecutive keys of an octave, the white key-sections of the octave being distinguished from each other by differentiating surfacing joined to a uniform distinguishable band-like strip extending across the top surface of the entire octave section, the surface of one end-key section of each octave section blending with said band-like strip, and the octave sections terminating on receding curves, whereby visually to tie the key-sections of the respective octave-sections together.

3. A chart for designating the keys of a piano and like instrument comprising an elongate strip of material adapted to be stood on the keys against the name-board of the instrument, the surface of the strip being divided into consecutive sections foldable on each other, each spanning the keys constituting an octave, such sections being lineally subdivided into smaller sections corresponding with the consecutive keys of an octave, the white key-sections of the octave being distinguished from each other by differentiating surfacing joined to a uniform distinguishable band-like strip extending across the top surface of the entire octave section, the surface of one end-key section of each octave section blending with said band-like strip, and the octave sections terminating on receding curves converging towards the old-lines of the chart whereby visually to tie the key-sections of the respective octave-sections together.

JOSEPHINE WATROUS HAZEN.